(12) United States Patent
Cok et al.

(10) Patent No.: US 8,534,542 B2
(45) Date of Patent: Sep. 17, 2013

(54) MAKING AN ORDERED ELEMENT LIST

(75) Inventors: Ronald Steven Cok, Rochester, NY (US); Thomas Joseph Murray, Cohocton, NY (US); Thiagarajah Arujunan, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

(21) Appl. No.: 13/351,645

(22) Filed: Jan. 17, 2012

(65) Prior Publication Data

US 2013/0181043 A1    Jul. 18, 2013

(51) Int. Cl.
  *G06F 17/00* (2006.01)
  *G06K 7/00* (2006.01)
  *G06K 7/10* (2006.01)
  *G06K 19/00* (2006.01)
  *G06K 19/06* (2006.01)

(52) U.S. Cl.
  USPC . 235/375; 235/435; 235/462.01; 235/462.07; 235/487; 235/492

(58) Field of Classification Search
  USPC .............. 235/375, 435, 462.01–462.49, 487, 235/492
  See application file for complete search history.

(56) References Cited

U.S. PATENT DOCUMENTS

| | | | | |
|---|---|---|---|---|
| 4,475,153 A | * | 10/1984 | Kihara et al. | ............... 700/16 |
| 5,962,839 A | * | 10/1999 | Eskildsen | ............ 235/472.01 |
| 6,199,048 B1 | | 3/2001 | Hudetz et al. | |
| 6,229,964 B1 | | 5/2001 | Bell | |
| 7,123,782 B2 | | 10/2006 | Shih et al. | |
| 7,273,175 B2 | | 9/2007 | Zhao et al. | |
| 7,835,037 B2 | | 11/2010 | Koide | |
| 7,841,531 B2 | | 11/2010 | Onogi | |
| 2004/0096123 A1 | | 5/2004 | Shih et al. | |
| 2009/0078772 A1 | | 3/2009 | Ofek et al. | |
| 2012/0067943 A1 | * | 3/2012 | Saunders et al. | ............ 235/375 |

* cited by examiner

*Primary Examiner* — Michael G Lee
*Assistant Examiner* — Laura Gudorf

(57) ABSTRACT

A method of making an ordered element list includes providing a plurality of machine-readable codes, each machine-readable code encoding a corresponding element or a reference to a corresponding element, and wherein each element of the plurality of elements forms a portion of a plurality of different ordered lists, each ordered list enabling a function having one or more operations; using a receiver to receive in order a digital image of each of a plurality of the machine-readable codes; using a processor to extract the elements received or referenced by the received digital images of the machine-readable codes; arranging the extracted elements in the received order to form an ordered list; and using a processor to perform the function enabled by the ordered list.

20 Claims, 11 Drawing Sheets

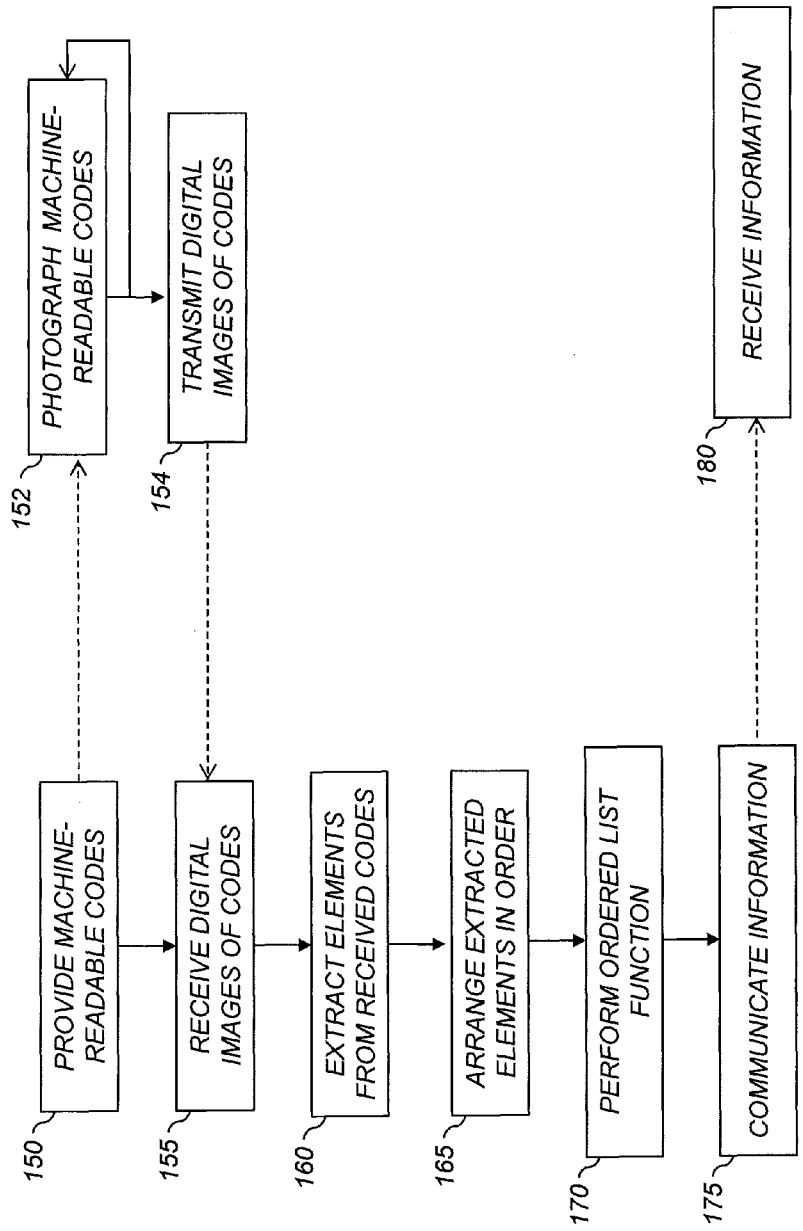

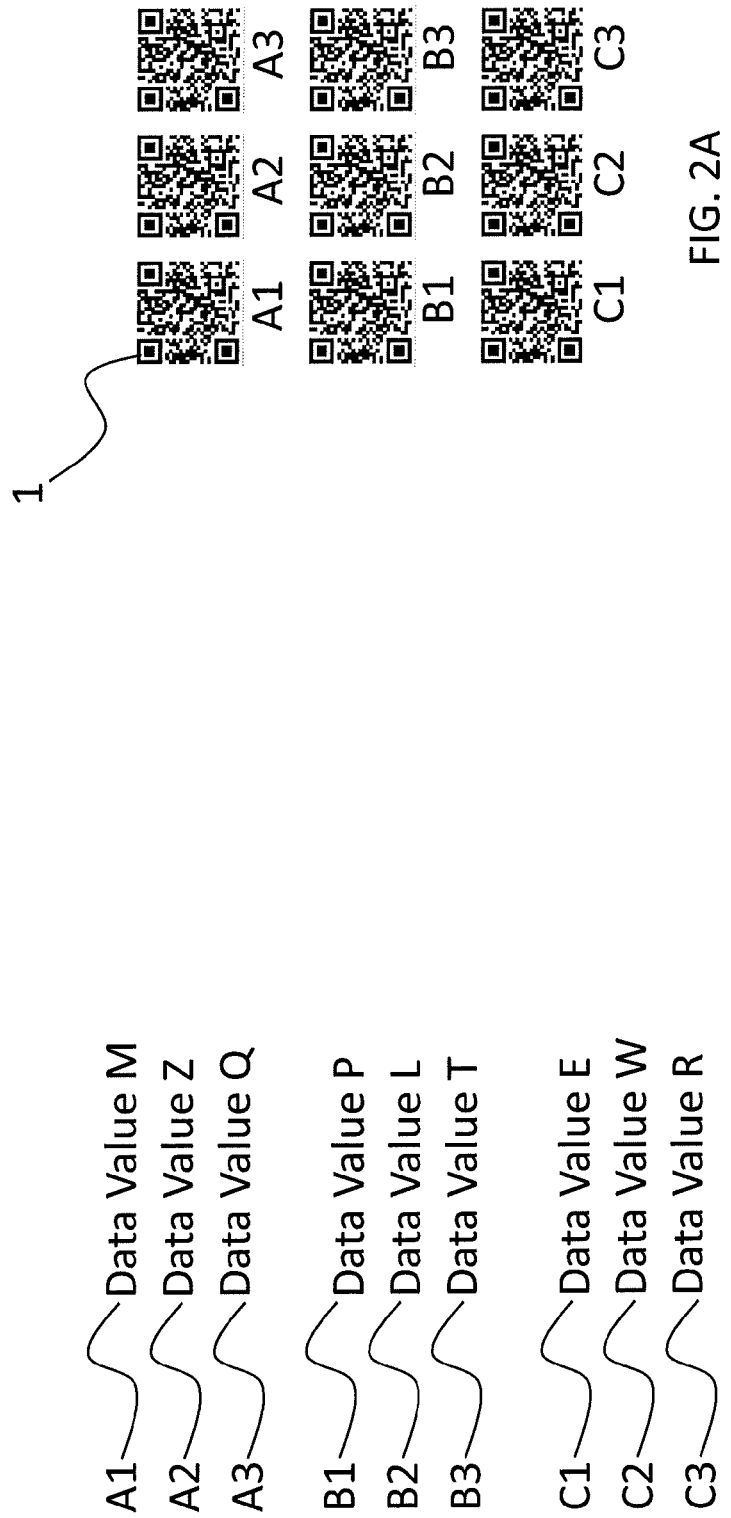

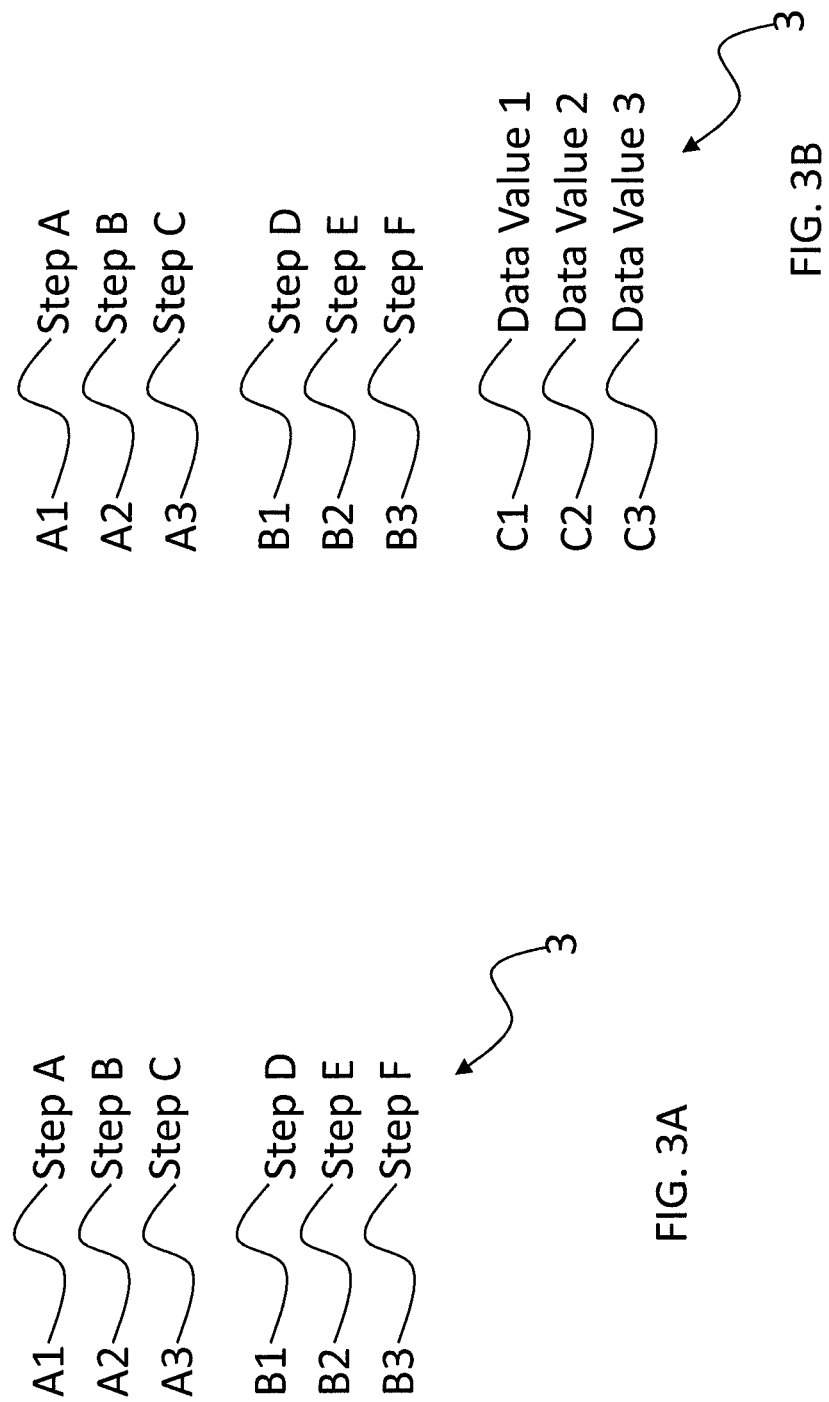

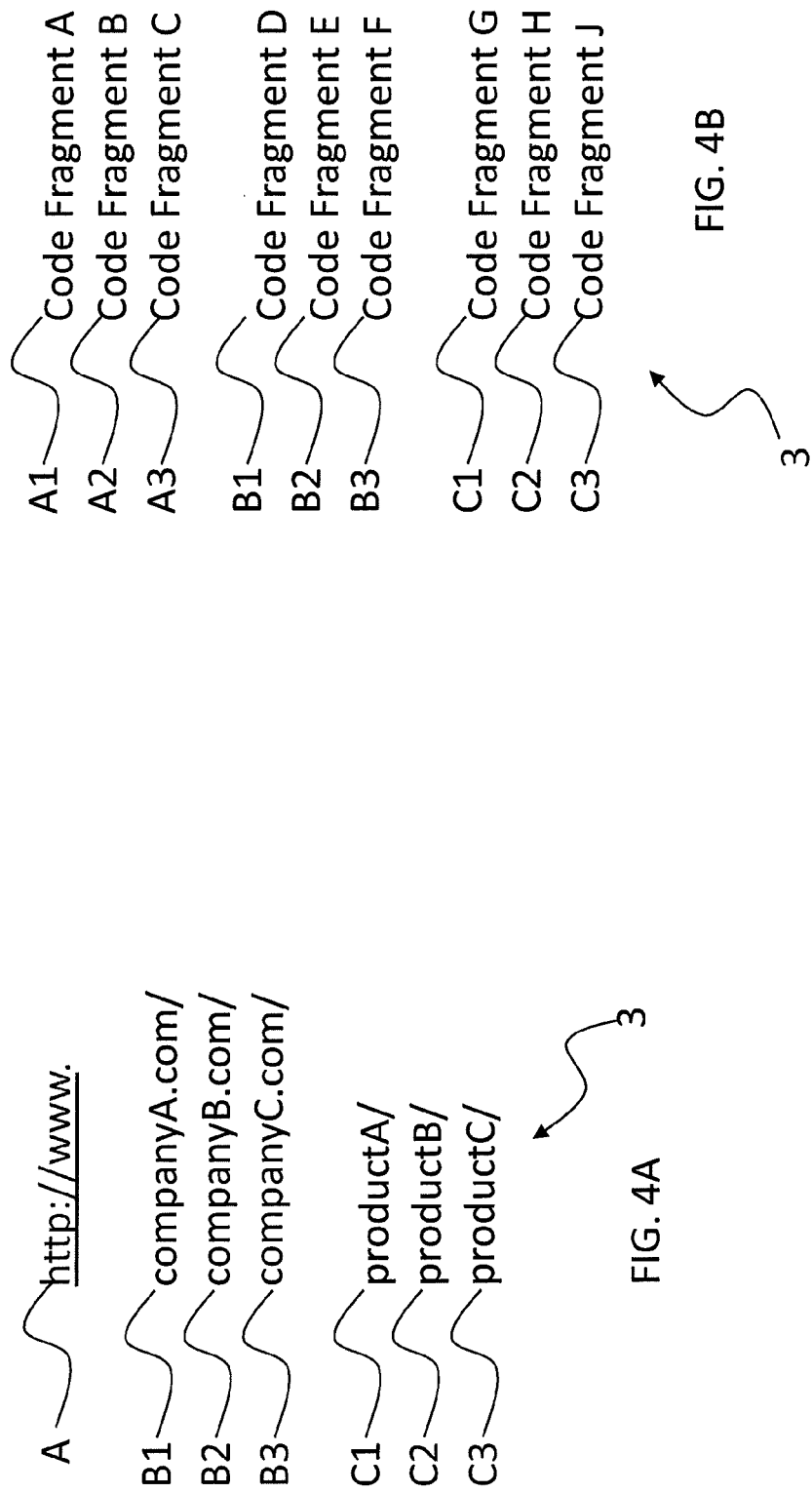

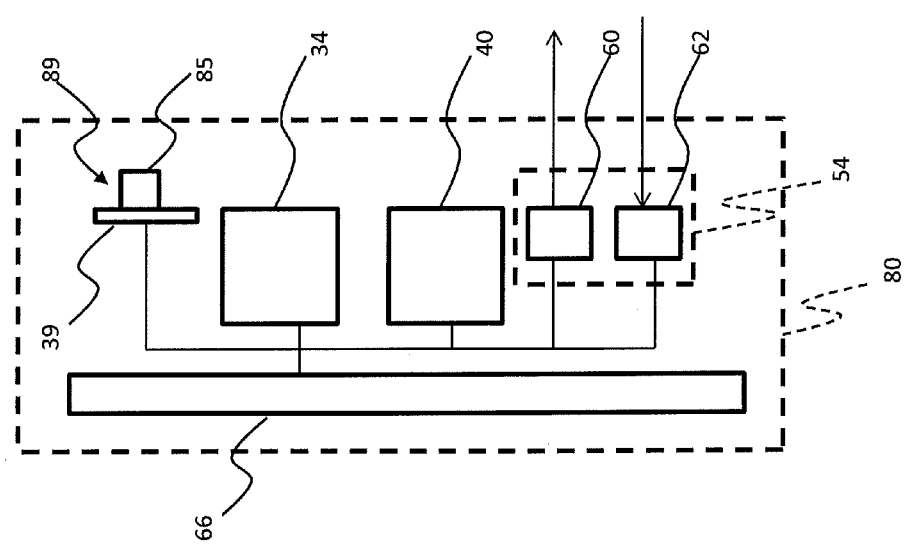

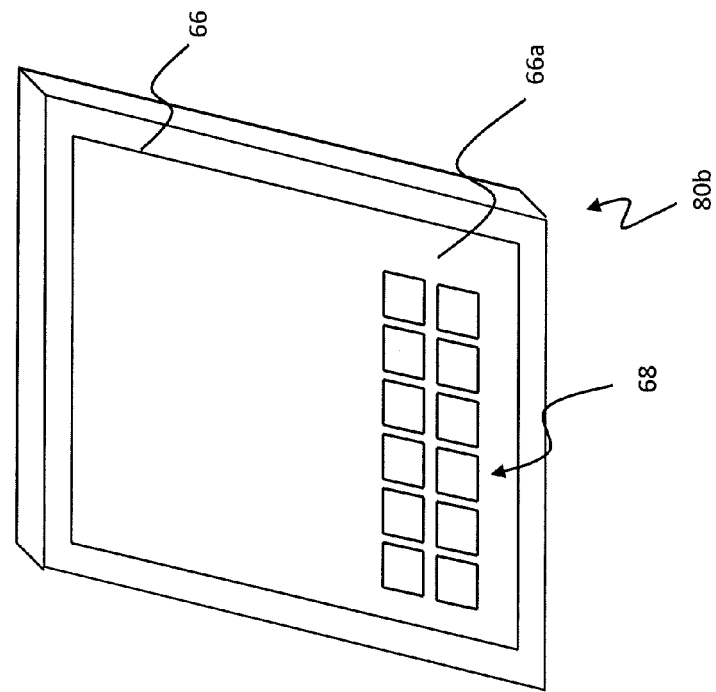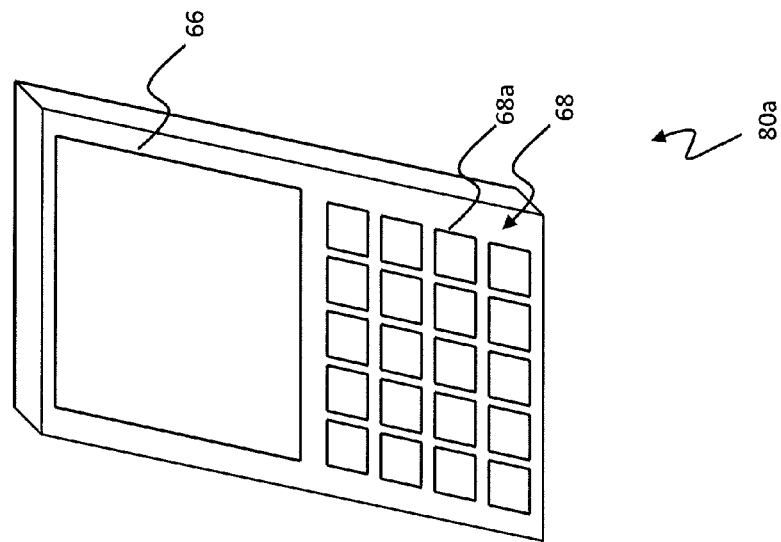
FIG. 8

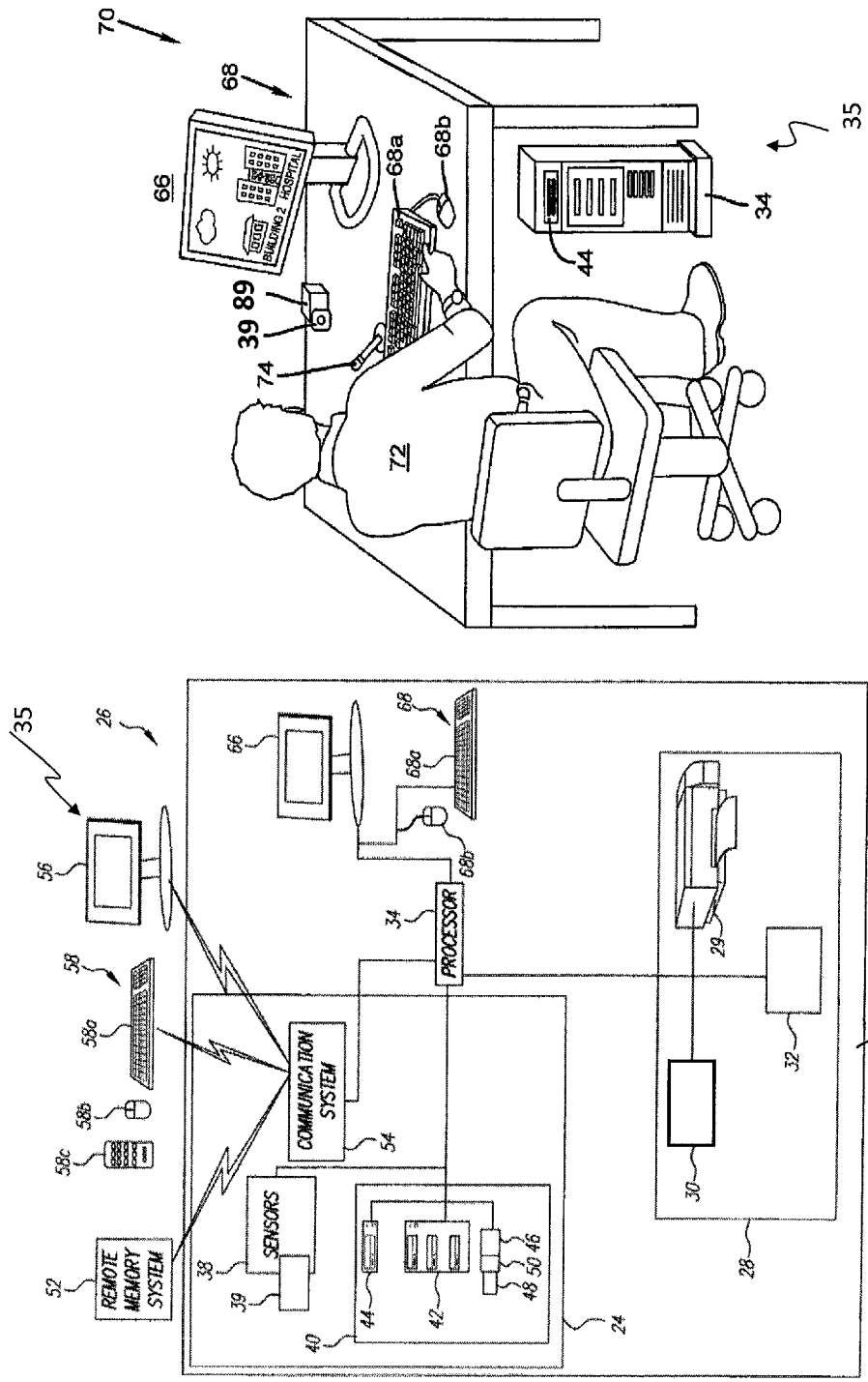

MAKING AN ORDERED ELEMENT LIST

CROSS REFERENCE TO RELATED APPLICATIONS

Reference is made to commonly-assigned U.S. patent application Ser. No. 13/192,505 entitled "Image Selection Method using Machine-Readable Codes", U.S. patent application Ser. No. 13/192,514, entitled "Index Print with Machine-Readable Codes", U.S. patent application Ser. No. 13/192,516 entitled "Selecting Images using Machine-Readable Codes", U.S. patent application Ser. No. 13/235,829 entitled "System for Managing Information using Machine-Readable Codes", and U.S. patent application Ser. No. 13/235,182 entitled "Managing Information using Machine-Readable Codes".

FIELD OF THE INVENTION

The present invention relates to the use of machine-readable codes for organizing and structuring information and, in particular, to making ordered lists and programs.

BACKGROUND OF THE INVENTION

Machine-readable codes have been in use for many years. Such codes are often implemented as optical codes that are read by capturing the reflection of electromagnetic radiation from the code. The ubiquitous one-dimensional barcode is used for product tracking and to automate purchases. For example, one-dimensional barcodes are in widespread use for managing point-of-sale purchase transactions using computer-controlled laser scanners.

More recently, two-dimensional codes, also known as matrix barcodes, such as QR ("Quick Response") codes, have become popular. Two-dimensional codes can encode a much greater quantity of information than one-dimensional codes. The information encoded in such codes is readily accessed through digital photographs of the codes that are processed by application software found in computers and mobile communication devices such as cell phones having digital signal processing and internet communication access. QR codes are frequently employed in conjunction with product advertising to provide an internet URI website link with information about the product advertised.

Optical bar codes are typically intended to be visually observable by humans, so that humans can find the codes and take appropriate action to access encoded information or otherwise use the codes. In contrast, steganographic information is designed to be hidden within an image. The present invention addresses optical codes that are intended to be observable to humans and does not address steganographic codes.

Referring to FIG. 12, a matrix barcode of the prior art is illustrated with dark and light elements forming black modules on a white background. As used herein, the term matrix barcode is used synonymously with two-dimensional optical code. A QR code is an example of a matrix barcode. Such codes are machine-readable codes 1 and are input by a machine (such as a scanner or digital imager), analyzed with image processing equipment and software, and the information encoded in the code decoded, extracted, and used.

The formation, printing, scanning, and decoding of one- and two-dimensional bar codes is known in the art. For example, U.S. Pat. No. 7,273,175 describes a method, apparatus and a storage medium for locating QR codes. An image processing apparatus including an optical reader and image processing hardware is discussed in U.S. Pat. No. 7,835,037. U.S. Pat. No. 7,841,531 discloses a camera operating system and matrix decoding device. U.S. Patent Application Publication 20090078772 describes techniques for decoding images of barcodes. U.S. Pat. No. 6,229,964 addresses an icon reader that reads picture identification data from a data icon on an image print. U.S. Pat. No. 7,123,782 describes using a code printed in association with a printed image to identify an electronic repository for a digital version of the printed image.

Codes on an image print can include a reference to remotely-stored information. A code reader can scan the code, decode the reference, and retrieve the information. For example, U.S. Pat. No. 6,199,048 describes a system and method for using identification codes found on ordinary articles of commerce to access remote computers on a network. U.S. Patent Application Publication 2004/0096123 discloses a method and system for locating and accessing digitally stored images including a hard copy print, method and system for producing the hard copy print.

These disclosures teach finding and decoding machine-readable codes 1 and accessing information referenced by machine-readable codes 1. Multiple machine-readable codes 1 can be available and reference independent information or choices for selection by a user. However, it can be the case that users are confronted with a variety of interdependent choices, for example a selection of product options or tasks to achieve a desired goal. The simple selection of an option or reference to information will not achieve the desired selection and organization of information choices or elements. They do not address the use of multiple machine-readable codes 1 by users to organize information. There remains a need, therefore, for a system and method for efficiently making an ordered element list using machine-readable codes 1.

SUMMARY OF THE INVENTION

In accordance with the present invention, there is provided a method of making an ordered element list, comprising:

providing a plurality of machine-readable codes, each machine-readable code encoding a corresponding element or a reference to a corresponding element, and wherein each element of the plurality of elements forms a portion of a plurality of different ordered lists, each ordered list enabling a function having one or more operations;

using a receiver to receive in order a digital image of each of a plurality of the machine-readable codes;

using a processor to extract the elements received or referenced by the received digital images of the machine-readable codes;

arranging the extracted elements in the received order to form an ordered list; and using a processor to perform the function enabled by the ordered list.

The present invention provides a system and method for efficiently making an ordered element list using machine-readable codes. A feature of the invention is that users confronted with a variety of interdependent choices can readily structure the desired information to achieve a desired end, and can do so without the use of a computer-based program and display interface.

These, and other attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIG. 1A is a flow diagram of a method according to an embodiment of the present invention;

FIG. 1B is a flow diagram of a method according to another embodiment of the present invention;

FIG. 2A is an assortment of machine-readable codes useful in understanding the present invention;

FIG. 2B is a list of data value elements useful in understanding the present invention;

FIG. 3A is a list of operation elements useful in understanding the present invention;

FIG. 3B is a list of data value and operation elements useful in understanding the present invention;

FIG. 4A is a list of elements useful in understanding the present invention;

FIG. 4B is a list of elements useful in understanding the present invention;

FIG. 7 is a schematic of a mobile communication device useful with the present invention;

FIG. 8 is a perspective of mobile communication devices useful with the present invention;

FIG. 10 is an illustration of an embodiment of a computer system useful in various embodiments of the present invention;

FIG. 11 is an illustration of an embodiment of a desktop computer, work station, or kiosk that can be used in a system of FIG. 10.

DETAILED DESCRIPTION OF THE INVENTION

Figure 3C:
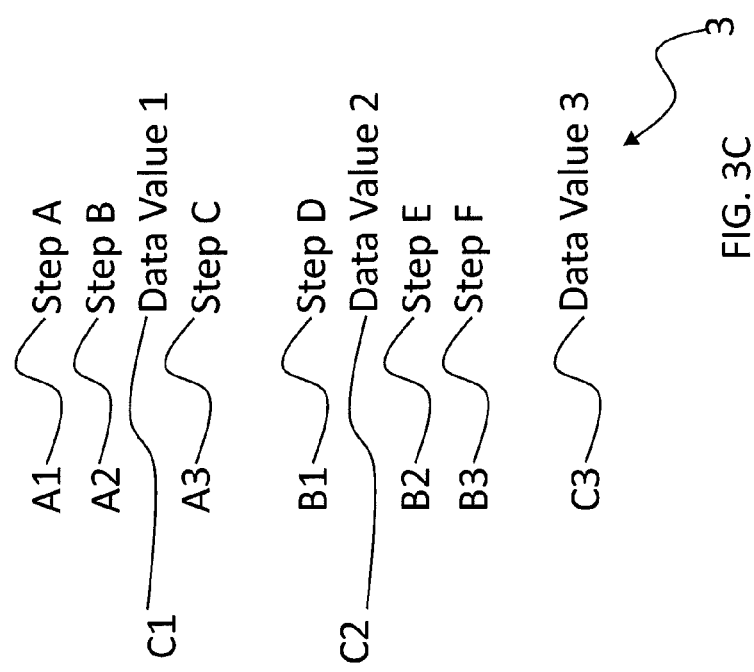
FIG. 3C is a list of data value and operation elements useful in understanding the present invention.

Referring to FIG. 1A, according to an embodiment of the present invention, a method of making an ordered element list includes providing a plurality of machine-readable codes in step 150. Each of the plurality of machine-readable code encodes a corresponding element or a reference to a corresponding element and each element forms a portion of a plurality of different ordered lists. Each ordered list enables a function having one or more operations. In step 155, a receiver is used to receive in order a digital image of each of a plurality of the machine-readable codes. A processor is used in step 160 to extract the elements received or referenced by the received digital images of the machine-readable codes. The extracted elements are arranged in the order to form an ordered list in step 165 and a processor is used to perform the function enabled by the ordered list in step 170.

Machine-readable codes 1 are codes printed or provided on a substrate, either permanently (for example as printed on paper) or temporarily (for example as provided on an electronically-controlled display). The codes are optical codes that are visible to a human observer and readable by a machine (for example a one- or two-dimensional scanner or a digital camera) responsive to the reflection of electromagnetic illumination (for example light) from the machine-readable code 1. Machine-readable codes 1 are, for example, one-dimensional or two-dimensional barcodes, or Quick Response codes.

Elements can include data values or references to data values, for example with a memory address, an index into a database, or a universal resource indicator. Elements can be operators, for example operators that process, receive, present, or store information. The operators are, for example, represented with program fragments or references to program fragments or functional operations or references to functional operations.

An ordered element list is a succession of elements stored in an order in a memory, for example in a memory in ascending-address locations whose relative addresses represent the order of the elements. Elements can also be stored in database entries with an order indicated as a variable in each database entry. Elements can also be stored in a linked list. Such methods and techniques for ordering information in an electronic storage system are known in the art.

The ordered element list enables a function having two or more operations. In one embodiment of the present invention, the ordered elements are operations and the ordered list specifies a multi-operation function operating on data, or presenting, storing, retrieving, or otherwise manipulating data or information. In another embodiment of the present invention, the ordered elements are data elements that specify multiple data values that are each operated upon thereby enabling two or more operations. The operations on each data value can be identical.

Referring to FIG. 1B and as discussed further below with reference to FIGS. 5-11, a user captures digital images of each of the elements (in a desired order in step 152, for example using a digital camera in a cellular telephone. The digital images are transmitted in the capture order in step 154 to a processing system that receives them in the order (in step 155 FIG. 1A). A processor in the processing system extracts, arranges, and processes the ordered elements as shown in FIG. 1A, and then communicates the resulting information (step 175) to the user, who receives the information in step 180. The dashed arrows in FIGS. 1A and 1B indicate communication interactions between a user or user-operated device and a processor. In various embodiments, the processor is a remote processor connected through a network to the user-operated device or is resident within a user-operated device.

Referring to FIG. 2A, machine-readable codes 1 encoding corresponding data value elements A1, A2, A3, B1, B2, B3, and C1, C2, C3 are illustrated in an arbitrary arrangement on a substrate. In this example, each element corresponds to a data element value, either coded in the element or referenced by the element. (Note that the actual codes as illustrated in this disclosure have no relevant value or reference.) The ordering process as a result of step 165 in FIG. 1A can provide an ordered element list 3 as illustrated in FIG. 2B. The ordered elements A1, A2, A3, B1, B2, B3, C1, C2, and C3 are processed to provide a desired result that is communicated to the user.

In an alternative embodiment illustrated in the example of FIG. 3A, the elements A1, A2, A3, B1, B2, and B3 are operations (each operation described as a "step" in the Figure). Each of the elements are photographed as described in FIGS. 1A and 1B and the steps are ordered in an ordered element list 3 to form a program or reference program elements that, when combined in the specified order and executed, form a multi-function operation that processes data, stores, retrieves, or manipulates data or otherwise produces useful information that is provided to a user. Each element can reference multiple operations or data elements. The elements can also reference actions and the order of elements in the list can specify a multi-action task. Thus, the present invention in various embodiments can manipulate information to provide a useful result or can implement or cause an action to take place.

Referring to FIG. 3B, the elements can include both operation elements A1, A2, A3, B1, B2, and B3 and data elements C1, C2, and C3. The ordered element list 3 resulting from the ordered capture of machine-readable codes 1 can then specify a functional operation and data on which the functional operation can operate.

Referring to FIG. 3C, the data elements C1, C2, and C3 are associated in the ordered element list 3 with operation elements A1, A2, A3, B1, B2, and B3, for example by locating a data element immediately after (or before) the operation element with which it is associated in the ordered element list 3. Thus, a data element can be specific to an operation for example by indicating the magnitude or extent of an operation. For example, data value element C1 can serve as an argument to operation element A2 and data value element C2 can serve as an argument to operation element B1. A data value element can also reference a set of operations, for example by specifying a number of repetitions of the operations to be performed on a data set or in an action. For example, data value element C3 can reference the number of repetitions of steps A, B, C, D, E, and F. Thus, the ordered element list 3 of the present invention can provide a structured program including operations, arguments, and data.

Therefore, according to various embodiments of the present inventions, a plurality of the machine-readable codes 1 encodes a reference to a corresponding operation, and each operation of the plurality of operations forms a portion of a plurality of different ordered element lists 3, each ordered list enabling a function. A processor extracts the operations referenced by the received digital images of the machine-readable codes 1 to arrange the extracted operations in the order to form an ordered element list 3. The function specified by the ordered element list 3 is performed. A machine-readable code 1 encoding a data value or a reference to a data value can be further provided and a processor used to extract the data values referenced by the received digital images of the machine-readable codes 1. The extracted operations and data value are arranged in the order to form an ordered element list 3, wherein the extracted data value modifies an extracted operation and a processor is used to perform the action specified by the ordered element list 3, including performing the data-value-modified operation. The data value can be an argument to an operation, modify the number of repetitions of the operation, the size of the operation, or the extent of the operation.

In another embodiment of the present invention, referring to FIG. 4A, a plurality of the machine-readable codes 1 encode an address fragment of a universal resource indicator. Each address fragment of the plurality of address fragments forms a portion of a plurality of different universal resource indicators and each universal resource indicator references information on a communications network. In this example, a user can photograph a machine-readable code 1 corresponding to A, one of the three machine-readable codes B1, B2, or B3, and one of the machine-readable codes C1, C2, C3, for example to access information related to one of multiple product choices (productA, productB, productC) sold by one of multiple companies (companyA, companyB, companyC). A processor is used to extract the address fragments referenced by the received digital images of the machine-readable codes 1, to arrange the extracted address fragment in the order to construct an ordered element list 3 that forms a desired universal resource indicator, and to access the information specified by the desired universal resource indicator.

In yet another embodiment of the present invention illustrated in FIG. 4B, a plurality of machine-readable codes 1 encode an element A1, A2, A3, B1, B2, B3, C1, C2, C3 or reference to an element of a data set. Each element A1, A2, A3, B1, B2, B3, C1, C2, C3 of the plurality of elements forms a portion of a plurality of data sets, each data set enabling access to information. In the example of FIG. 4B, the data set is a security code having three portions, and each element A1, A2, A3, B1, B2, B3, C1, C2, C3 is a fragment of the security code. Thus, one of elements A1, A2, and A3, followed by one of elements B1, B2, and B3, followed by one of elements C1, C2, and C3 is photographed by a user. A receiver is used to receive in order a digital image of each of a plurality of the machine-readable codes 1. A processor extracts the elements A1, A2, A3, B1, B2, B3, C1, C2, C3 referenced by the received digital images of the machine-readable codes 1 to arrange the extracted elements A1, A2, A3, B1, B2, B3, C1, C2, C3 in the order to construct an ordered element list 3 that forms a desired data set. The desired data set is then used, for example as a password to access the information. Thus, in this example, three of nine elements should be selected in the correct order to form a required password to access information.

In a further embodiment of the present invention, the machine-readable codes 1 are provided with or in an image and the image is provided with the machine-readable code 1. The elements A1, A2, A3, B1, B2, B3, C1, C2, C3 can specify data or operations relevant to the images with which they are associated, for example a function specifying an operation on or with one or more associated images.

In various embodiments of the present invention, the code is a machine-readable code 1, for example an optical code, a one-dimensional barcode, a two-dimensional bar code, a matrix code, or a QR ("Quick Response") code. A variety of such codes are known in the art. In various embodiments, the code is provided on a variety of substrates, for example printed on sheets of paper, cards, or electronically presented on a display.

Information referenced by machine-readable codes 1 can be audio, image, numerical values, or text information, or any combination of audio, image, numerical values, or text information, or can be other types of digital information that can be stored in a retrieval system. The information can be references to other information, information stored in other locations, or the location of other stored information. The referenced information can be stored in a variety of ways, for example as a single file or multiple files, stored in a database including one or more files, or stored within a folder in a logical file-storage hierarchy of one or more files. Such storage methods are known in the computer science arts.

The machine-readable codes 1 can be provided by a service provider, for example an on-line service provider. A user of the services provided by the service provider can photograph or scan the machine-readable codes 1, for example, employing a smart-phone with an integrated digital camera. In one embodiment, the extraction of elements A1, A2, A3, B1, B2, B3, C1, C2, C3 from digital images of the machine-readable codes 1 is performed on a mobile communication and processing device, such as a smart-phone. In another embodiment, the digital images are transmitted to the service provided for element extraction. Likewise, the ordered element list 3 can be formed on a user's device or by a remote service provider, as can the operation. Data values can be resident on a user's storage device (e.g. in the same device that captured the digital images or in a computer connected to a user's network) or on a remote storage device, for example accessible to a service provider.

Such smart-phone devices, digital cameras, and software are known in the art. Software is used to transfer the extracted elements A1, A2, A3, B1, B2, B3, C1, C2, C3 stored in the smart-phone to the service provider. Software operative on the service provider's server can receive the transferred information, creates the ordered element list 3, and performs the operation.

The present invention can be usefully applied to compiling a set of data resources, such as images, and to organize them, for example in an image product, without requiring the operation of a user interface on a mobile device display or at a remote computer, for example at home. The use of different machine-readable codes 1 can enable a user to specify information such as options or processing relevant to the construction of the image product. Thus, in some embodiments, user interface or touch screen operations are eliminated.

In a more specific example, a user can desire to perform a series of operations on an image or video in a specific sequence. For example, a user can request an adjustment in an image's tone scale and color balance, followed by a cartoonize step (outline simplification and contouring), followed by a color boost to saturate image colors, followed by a crop step to center the area of interest in an image or image sequence, followed by an instruction to repeat the tasks on the images in a collection or sequence. In this example, each of the steps constitutes an operation element and the order in which the operation elements are performed forms an ordered list. A data value element in the list can reference the image or images to be operated upon. An alternative order that a user might select is a crop operation, followed by a color boost, a tone scale and color balance operation, and a cartoonize step.

In another example, a user might desire a printed itinerary for a set of desired destinations. The user selects and photographs codes corresponding to each desired destination in the order in which the destinations are to be visited (for example urban transit stops in a city subway and bus system). A processor then produces an itinerary with times and transport vehicle identifiers corresponding to the destination and order specified. In this example, the destinations are data values and the ordered list is the order in which the destinations are to be visited.

In yet another example, users at an event can participate in a musical extravaganza. A variety of codes are presented to users, the codes corresponding to musical instruments. Each user photographs a code corresponding to a desired instrument (for example from a large display, such as a large LED display in a stadium) or from a printed program with a mobile device that also incorporates playback capability and network connectivity to a common software application. The application then starts the participating mobile devices at a common time and directs the mobile devices to play a part in the musical event. Separate parts for each instrument can also be selected and played back. The parts can be restricted by location of the participant within the group space (e.g. seat location in a stadium) to provide, for example, a horn section or drum section. Since the parts depend on the previously selected instrument, the order of the selection is needed. In a stadium with, for example, 100,000 participants, a large volume of music and large number of instruments and parts can together provide an interesting experience. Participants can be motivated by a selection of music choices that correspond to participant interest, e.g. team fight songs or a national anthem.

Figure 5:
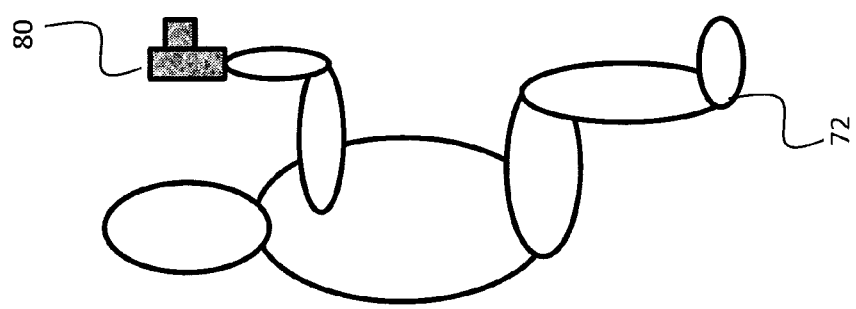
FIG. 5 is a schematic of a user photographing a machine-readable code according to a method of the present invention.

The capture, transmission, and storage of digital information such as images, videos, audio, and text are well known in the art. For example, as shown in FIGS. 5 and 11, a user 72 can use a mobile communication system 80 that incorporates a digital camera 89 to photograph machine-readable codes 1 and other digital images. The mobile communication system 80 is located at a suitable distance from the machine-readable code 1 (as technically enabled by the digital camera 89 in the mobile communication system 80, for example using the optical lens system 85 shown in FIG. 7) for photographing the machine-readable code 1. Suitable mobile communication systems 80 are known in the art. According to another embodiment of the present invention, the mobile communication system 80 incorporating a digital camera 89 includes a processor 34 that executes software programs to implement the various methods of the present invention.

Thus, according to an embodiment of the present invention and as also illustrated in FIG. 7, an apparatus for performing a functional operation includes a mobile imaging device including a digital camera 89, a processor 34, and a storage device 40, the storage device 40 storing programs for executing a plurality of operations with the processor and a data set. The mobile imaging device is adapted to using the digital camera 89 to photograph a plurality of machine-readable codes 1, each machine-readable code 1 encoding a corresponding element A1, A2, A3, B1, B2, B3, C1, C2, C3 or a reference to a corresponding element A1, A2, A3, B1, B2, B3, C1, C2, C3, and wherein each element A1, A2, A3, B1, B2, B3, C1, C2, C3 of the plurality of elements forms a portion of a plurality of different ordered element lists 3, each ordered element list 3 enabling a function having one or more operations. The stored program is adapted to extracting the elements A1, A2, A3, B1, B2, B3, C1, C2, C3 encoded from the photographed machine-readable codes 1, arranging the extracted elements A1, A2, A3, B1, B2, B3, C1, C2, C3 in the order to form an ordered element list 3, and performing the function enabled by the desired ordered element list 3.

Figure 6:
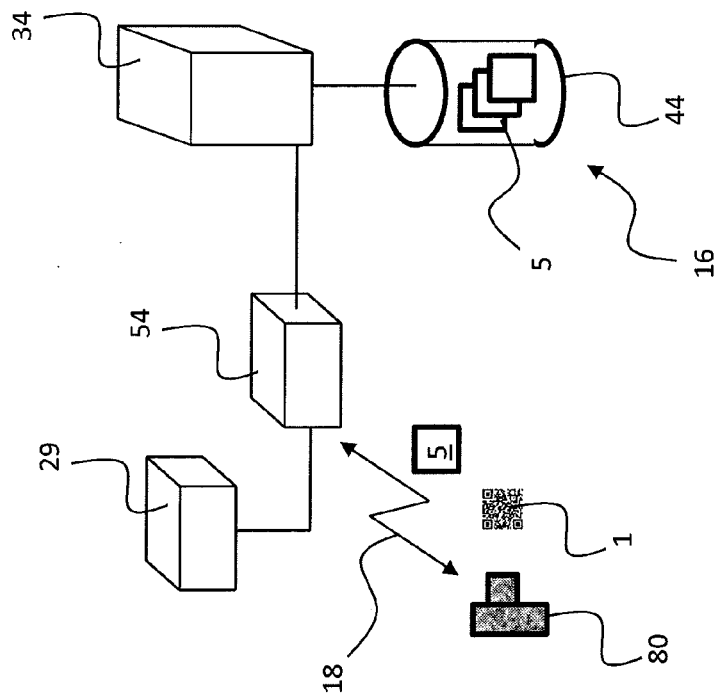
FIG. 6 is a schematic of a system useful with the present invention.

Alternatively, as shown in FIG. 6, a variety of systems that communicate with mobile communication system 80 through wireless (e.g. WiFi, Bluetooth) or wired (e.g. wired Ethernet, USB) communication channels 18 are known and can be used to implement the various methods of the present invention. Referring to FIG. 6, in one embodiment, such a mobile communication system 80 can include a communication system 54, a processor 34 and an electronic storage and retrieval system 16 (e.g. a disk drive 44), and an output system such as printer 29 communicatively interconnected. Such computer system components are well known in the art as are software applications, utilities, and programs that execute on the processor 34. The processor 34 can be a single processor or can include multiple processors or distributed processors. The processing tasks can be done on a single processor 34 or can be done using multiple, different processors 34. Information and software storage locations can include an electronic storage and retrieval system 16, the processor 34 connected to one or more remote client computer(s) (e.g. mobile communication system 80) through a communication channel 18, the processor 34 connected and having access to the electronic storage and retrieval system 16. The communication channel 18 can be a network and can interact with the processor 34 through the communication system 54.

The user 72 can photograph machine-readable codes 1 and process them locally or transmit the captured information through the communication channel 18 to the communication system 54 to be stored by the processor 34 on the disk drive 44 in the electronic storage and retrieval system 16 as a digital image 5 that is processed on the remote processor 34.

The processor 34 can include circuits to transmit and receive information from and to a remote client computer (e.g. mobile communication system 80), receive digital images 5 from the remote client computer mobile communication system 80 through the communication channel 18, and store the received digital images 5 in the electronic storage and retrieval system 16. The processor 34 also includes circuits to receive references or receive photographs of machine-readable codes 1 and extract the references from the received photographs of the machine-readable codes 1. Computer system components for storing, communicating, retrieving, and processing digital images 5 are known in the art and discussed in greater detail with respect to FIGS. 7-11 below.

Thus, according to an alternative embodiment of the present invention, an apparatus for performing a functional operation includes a processor 34 connected to a communications network 18 and a storage device 16, the storage device 40 storing programs for executing a plurality of operations with the processor 34 and a data set. The processor 34 includes circuits, local display 66, or printers 29 to provide a plurality of machine-readable codes 1, each machine-readable code 1 encoding a corresponding element A1, A2, A3, B1, B2, B3, C1, C2, C3 or a reference to a corresponding element A1, A2, A3, B1, B2, B3, C1, C2, C3, and wherein each element A1, A2, A3, B1, B2, B3, C1, C2, C3 of the plurality of elements A1, A2, A3, B1, B2, B3, C1, C2, C3 forms a portion of a plurality of different ordered element lists 3, each ordered element list 3 enabling a function having one or more operations. The apparatus includes a receiver for receiving in order a digital image 5 of each of a plurality of the machine-readable codes 1. The stored program extracts the elements A1, A2, A3, B1, B2, B3, C1, C2, C3 referenced by the received digital images 5 of the machine-readable codes 1, arranges the extracted elements A1, A2, A3, B1, B2, B3, C1, C2, C3 in the order to form a desired ordered element list 3, and performs the function enabled by the desired ordered element list 3.

The apparatus can further include circuits for receiving the digital images 5 of the machine-readable code 1 (FIG. 1A, Step 155) from a user 72 and communicating a result of the function to the user 72. In another embodiment, the apparatus further includes receiving circuits for receiving data from a user 72, functional circuits for operating on the received data, and transmitting circuits for communicating operated-upon received data to the user 72.

Referring in more detail to the mobile communication system 80, as shown in FIG. 7, a mobile communication system 80 useful in various embodiments of the present invention can include a local display 66 connected to a processor 34, a memory 40, communication system 54 including a transmitter 60 and a receiver 62, and an image sensor 39 with the optical lens system 85 forming the digital camera 89. The processor 34 can execute software stored in the memory 40 to acquire digital images 5 with the digital camera 89, display the digital images 5 on the display 66, store the digital images 5 in the memory 40, or transmit the digital images 5.

The processor 34 can also receive software from a network storage device and execute the software. The digital image 5 is a scene or an image of a printed or displayed thumbnail image or of a machine-readable code 1. Such image capture, display, and storage software is known. In one embodiment, the mobile communication system 80 can include software stored in the memory 40 executed by the processor 34 to extract encoded references from photographs of machine-readable codes 1. Software for forming machine-readable codes 1 and for extracting references from machine-readable codes 1 is known.

FIG. 8 is a perspective of a mobile communication system 80a and 80b that include the local display 66 together with a local input mechanism 68 such as a local keyboard 68a (FIG. 8). Mobile communication system 80b includes a display 66a that incorporates a touch-screen providing local input 68. Both mobile communication systems 80a that include keyboards 68a or mobile communication systems 80b that include local displays with touch-screens 66a are known in the art. As shown in FIG. 7, a mobile communication system 80 can communicate through a communication channel 18 (FIG. 6), either through wireless or wired networks, or through a point-to-point communication device, with a remote display to display images, for example, on a larger display than is present on the mobile communication system 80 itself.

Figure 9:
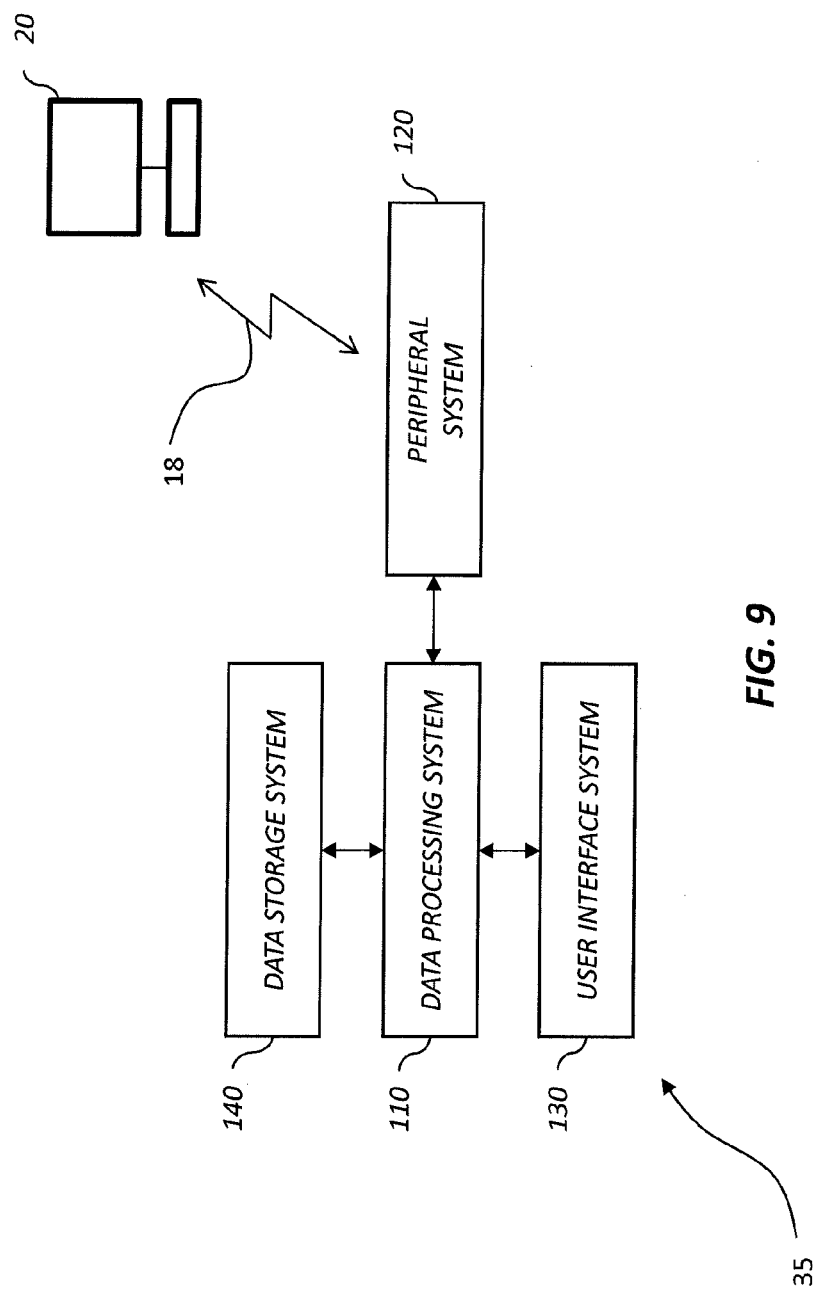
FIG. 9 is a schematic of a simple system useful in various embodiments of the present invention.
Figure 12:
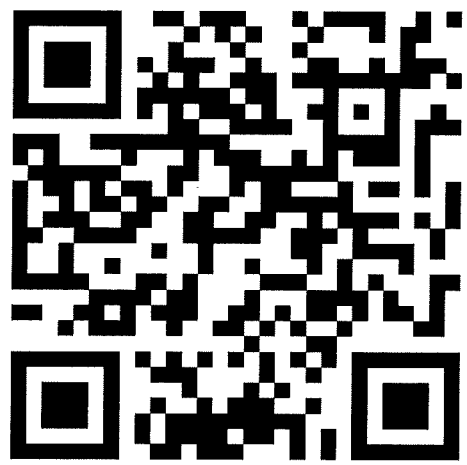
FIG. 12 is a prior-art QR code useful in understanding the present invention.

FIG. 9 is a high-level diagram showing the components of a remote electronic computer system 35 useful for implementing various embodiments of the present invention. The remote electronic computer system 35 includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140. The peripheral system 120 can be connected through a communication channel 18 (e.g. the internet or cell-phone networks) to other electronic computer systems 20.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 9.

As shown in FIG. 10 in more detail, a computer system according to various embodiments of the present invention includes the electronic computer system 20, for example a computer server, connected to a remote electronic computer system 35, for example a remote client computer such as a mobile communication device 80 (FIG. 6), through a communication channel 18 (FIG. 6), the electronic computer system 20 including memory 40 for storing one or more digital image files communicated through the computer network to the remote electronic computer system 35, the remote electronic computer system 35 having the local display 66 for displaying the digital images 5 in a graphic user interface.

In the embodiment of FIG. 10, the electronic computer system 20 includes the source of content data files 24, the user input system 26 and the output system 28 connected to the processor 34. The source of content data files 24, user-input system 26 or output system 28, and processor 34 are positioned within the housing 22 as illustrated. In other embodiments, circuits and systems of the source of content data files 24, user input system 26 or output system 28 are positioned in whole or in part outside of housing 22.

The source of content data files 24 can include any form of electronic or other circuit or system that can supply digital data to processor 34. In this regard, the content data files 24 can include, for example and without limitation, still images, image sequences, video graphics, and computer-produced images. Source of content data files 24 can optionally capture images to create content data for use in content data files by use of capture devices located at, or connected to, electronic computer system 20 or can obtain content data files 24 that have been prepared by or using other devices such as the remote electronic computer system 35. In the embodiment of FIG. 10, source of content data files 24 includes sensors 38, the memory 40 and the communication system 54.

Sensors 38 are optional and can include light sensors, biometric sensors and other sensors known in the art that can be used to detect conditions in the environment of electronic computer system 20 and to convert this information into a form used by processor 34 of electronic computer system 20. Sensors 38 can also include one or more image sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within electronic computer system 20 or it can be removable. In the embodiment of FIG. 10, electronic computer system 20 is shown having a hard drive 42, the disk drive 44 for a removable disk such as an optical, magnetic or other disk memory (not shown) and the memory card slot 46 that holds the removable memory 48 such as a removable memory card and has the removable memory interface 50 for communicating with removable memory 48. Data including, but not limited to, control programs, digital images and metadata can also be stored in the remote memory system 52 such as the remote electronic computer system 35, a personal computer, computer network or other digital system. Remote memory system 52 can also include solid-state, magnetic, optical or other data-storage devices.

In the embodiment shown in FIG. 10, electronic computer system 20 has the communication system 54 that in this embodiment is used to communicate with remote electronic computer systems 35 for example including an optional remote memory system 52, an optional remote display 56, or optional remote input 58 (also referred to herein as "remote input 58"). The optional remote memory system 52, optional remote display 56, and optional remote input 58 can all be part of the remote electronic computer system 35 having the remote input 58 with remote input controls, and that can communicate with communication system 54 wirelessly as illustrated or can communicate in a wired fashion. In an alternative embodiment, a local input station including either or both of the local display 66 and local input controls 68 (also referred to herein as "local user input 68") are connected to communication system 54 using a wired or wireless connection.

Communication system 54 can include for example, one or more optical, radio frequency or other transducer circuits or other systems that convert image and other data into a form that is conveyed to a remote device such as the remote memory system 52 or the remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remote electronic computer systems 35 that access the electronic computer system 20 through a web browser. Alternatively, the remote electronic computer system 35 can provide web services to electronic computer system 20 depending on the configurations of the systems.

User input system 26 provides a way for a user 72 (FIG. 11) of electronic computer system 20 to provide instructions to processor 34. This permits the user 72 to make a designation of content data files 24 to be used in producing a digital image file and to select an output form for an output product or print. User input system 26 can also be used for a variety of other purposes including, but not limited to, permitting the user 72 to arrange, organize and edit content data files 24 to be incorporated into the image-enhanced output product, to provide information about the user or audience, to provide annotation data such as voice and text data, to identify characters in the content data files 24, and to perform such other interactions with electronic computer system 20 as are described herein.

In this regard user input system 26 can include any form of transducer or other device capable of receiving an input from the user 72 and converting this input into a form used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 10, user input system 26 includes the optional remote input 58 including a remote keyboard 58a, a remote mouse 58b, and a remote control 58c and the local user input 68 including a local keyboard 68a and a local mouse 68b.

Remote input 58 can take a variety of forms, including, but not limited to, the remote keyboard 58a, remote mouse 58b or remote control handheld device 58c illustrated in FIG. 10. Similarly, local input 68 can take a variety of forms. In the embodiment of FIG. 10, local display 66 and local input 68 are shown directly connected to processor 34.

As is illustrated in FIG. 11 local input 68 can take the form of an editing area 70 such as a home computer, an editing studio, or kiosk that can also be the remote electronic computer system 35. In this illustration, the user 72 is seated before a console including local keyboard 68a and mouse 68b, disk drive 44, and a local display 66 which is capable, for example, of displaying multimedia content, for example in a graphic user interface. As is also illustrated in FIG. 11, editing area 70 can also have sensors 38 (FIG. 10) including, but not limited to, image sensors 39, audio sensors 74 and other sensors such as multispectral sensors that can monitor user 72 during a production session or provide other information such as images.

Output system 28 (FIG. 10) is used for rendering images, text or other graphical representations in a manner that permits printing image, text, or other graphical representations. In this regard, output system 28 can include any conventional structure or system that is known for printing or recording images on an output device 32 including, but not limited to, a printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as a type that produces color images. However, it will be appreciated that this is not needed and that the claimed methods and apparatuses herein can be practiced with the printer 29 that prints monotone images such as black and white, grayscale, or sepia-toned images. As will be readily understood by those skilled in the art, the electronic computer system 20 can be separated from the remote electronic computer system 35 connected to the printer 29.

In certain embodiments, the source of content data files 24, user input system 26 and output system 28 can share components.

Processor 34 operates electronic computer system 20 based upon signals from user input system 26, sensors 38, (FIG. 10) memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

In an embodiment of the present invention illustrated in FIGS. 7 and 8, the remote electronic computer system 35 is a mobile communication system 80, for example a cellular telephone, a smart phone, or a wirelessly connected handheld computer such as a tablet computer. The mobile communication system 80 can include the local display 66 or the user-input system incorporating the local input 68 keyboard 68a. In another embodiment, a local input 68 device is a touch screen. The mobile communication system 80 can communicate with electronic computer system 20 directly, for example through a wireless local area network or a point-to-point wireless connection, or indirectly through a cellular telephony network. The electronic computer system 20 can be a computer server, for example providing browser-based web pages to the remote electronic computer system 35, and mobile communication system 80 through the internet.

Any of the electronic computer system 20, remote electronic computer system 35, or the mobile communication system 80 can execute software programs on the internal processor 110, 34. The software programs can interact with the user 72 through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain embodiments thereof, but it will be understood that variations and modifications can be effected within the spirit and scope of the invention.

PARTS LIST

A1, A2, A3 element
B1, B2, B3 element
C1, C2, C3 element
1 machine-readable code
3 ordered element list
5 digital image
16 electronic storage and retrieval system
18 communication channel or network
20 electronic computer system
22 housing
24 source of content data files
26 user input system
28 output system
29 printer
30 tangible surface
32 output device
34 processor
35 remote electronic computer system
38 sensors
39 image sensors
40 memory, storage device
42 hard drive
44 disk drive
46 memory card slot
48 removable memory
50 memory interface
52 remote memory system
54 communication system
56 remote display
58 remote input
58a remote keyboard
58b remote mouse
58c remote control
60 transmitter
62 receiver
66 local display
66a local display with touch screen
68 local input
68a local keyboard
68b local mouse
70 editing area (home computer, editing studio, or kiosk)
72 user
74 audio sensors
80, 80a, 80b mobile communication system
85 optical lens system
89 digital camera
110 data processing system
120 peripheral system
130 user interface system
140 data storage system
150 provide machine-readable codes step
152 photograph machine-readable codes step
154 transmit machine-readable codes step
155 receive digital images of codes step
160 extract elements from received codes step
165 arrange elements in order step
170 perform ordered list function step
175 communicate information step
180 receive information step

The invention claimed is:

1. A method of making an ordered element list, comprising:
providing a plurality of machine-readable codes, each machine-readable code encoding a corresponding element or a reference to a corresponding element, and wherein each element forms a portion of a plurality of different ordered lists, each ordered list enabling a function having two or more operations;
using a receiver to receive in order a digital image of each of a plurality of the machine-readable codes;
extracting, using a processor, the elements received or referenced by the received digital images of the machine-readable codes;
arranging the extracted elements in the received order to form an ordered list; and
performing, using the processor, the function enabled by the ordered list, wherein one or more of the elements are data elements and one or more of the elements are operations, wherein the ordered list specifies a function performed on the data elements, and wherein the function performed on the data elements modifies the data elements.

2. The method according to claim 1, wherein more than one of the elements are data elements and the ordered list specifies a set of data elements.

3. The method according to claim 1, wherein more than one of the elements are operations and the ordered list specifies a multi-operation function.

4. The method according to claim 1, wherein more than one of the elements are actions and the ordered list specifies a multi-action task.

5. The method according to claim 1, wherein one or more of the elements specifies a plurality of operations.

6. The method according to claim 1, wherein a second data element is an operation argument or specifies magnitude or extent of a second operation.

7. The method according to claim 1, wherein the machine-readable codes are provided with or in an image and the image is provided with the machine-readable code.

8. The method according to claim 7, wherein the function includes an operation on or with the image, wherein the image is modified.

9. The method according to claim 1, wherein a plurality of the machine-readable codes encodes a reference to a corresponding operation, and wherein each operation of the plurality of operations forms a portion of a plurality of different ordered lists, each ordered list enabling a function; and wherein the method further comprises extracting, using the processor, the operations referenced by the received digital images of the machine-readable codes, to arrange the extracted operations in the order to form an ordered list, and to perform the function specified by the ordered list.

10. The method according to claim 9, further including:
providing a machine-readable code encoding a data value or a reference to a data value,
extracting, using the processor, the data values referenced by the received digital images of the machine-readable codes;
arranging the extracted operations and data values in the order to form an ordered list, wherein the extracted data value modifies an extracted operation; and
performing, using the processor, the action specified by the ordered list, including performing the data-value-modified operation.

11. The method according to claim 10, wherein the data value is an argument to an operation, modifies a number of repetitions of the operation, a size of the operation, or an extent of the operation.

12. The method according to claim 1, wherein a plurality of the machine-readable codes encode an address fragment of a universal resource indicator, and wherein each address fragment of the plurality of address fragments forms a portion of a plurality of different universal resource indicators, each universal resource indicator referencing information on a communications network; and wherein the method further comprises extracting, using the processor, the address fragments referenced by the received digital images of the machine-readable codes, to arrange the extracted address fragment in the order to form a desired universal resource indicator, and to access information specified by the desired universal resource indicator.

13. The method according to claim 1, wherein a plurality of the machine-readable codes encode an element or reference to an element of a data set, and wherein each element of the plurality of elements forms a portion of a plurality of data sets; and wherein the method further comprises extracting, using the processor, the elements referenced by the received digital images of the machine-readable codes, to arrange the extracted elements in the order to form a desired data set, and to use the desired data set to access the information.

14. The method according to claim 1, wherein a plurality of machine-readable codes encode an element or reference to an element of a data set, and wherein each element of the plurality of elements forms a portion of a plurality of data sets, each data set enabling access to information; and wherein the method further comprises receiving, using a receiver, in order a digital image of each of a plurality of the machine-readable codes, and wherein the method further comprises:

extracting, using the processor, the elements referenced by the received digital images of the machine-readable codes and to arrange the extracted elements in the order to form a desired data set; and using the desired data set to access the information.

15. An apparatus for performing a functional operation, comprising:

a mobile imaging device including a digital camera, a processor, and a storage device, the storage device configured to store programs for executing a plurality of operations with the processor and a data set;

the mobile imaging device configured to use the digital camera to photograph a plurality of machine-readable codes, each machine-readable code encoding a corresponding element or a reference to a corresponding element, and wherein each element of the plurality of elements forms a portion of a plurality of different ordered lists, each ordered list enabling a function having one or more operations; and wherein the stored program is configured to extract the elements encoded from the photographed machine-readable codes, arranging the extracted elements in the order to form an ordered list, and performing the function enabled by the ordered list, and wherein one or more of the elements are data elements and one or more of the elements are operations, wherein the ordered list specifies a function performed on the data elements, and wherein the function performed on the data elements modifies the data elements.

16. An apparatus for performing a functional operation, comprising:

a processor connected to a communication network and a storage device, the storage device configured to store programs for executing a plurality of operations with the processor and a data set;

the processor configured to provide a plurality of machine-readable codes, each machine-readable code encoding a corresponding element or a reference to a corresponding element, and wherein each element of the plurality of elements forms a portion of a plurality of different ordered lists, each ordered list enabling a function having one or more operations; and a receiver configured to receive in order a digital image of each of a plurality of the machine-readable codes; and wherein the stored program is configured to extract the elements referenced by the received digital images of the machine-readable codes, arranges the extracted elements in the order to form an ordered list, and performs the function enabled by the ordered list, wherein one or more of the elements are data elements and one or more of the elements are operations, wherein the ordered list specifies a function performed on the data elements, and wherein the function performed on the data elements modifies the data elements.

17. The apparatus according to claim 16, further including circuits configured to receive the digital images of the machine-readable code from a user and communicating a result of the function to the user.

18. The apparatus according to claim 16, further comprising:

receiving circuits configured to receive data from a user;

functional circuits configured to operate on the received data; and transmitting circuits configured to communicate operated-upon received data to the user.

19. The apparatus of claim 15, wherein the machine-readable codes are provided with or in an image and the image is provided with the machine-readable code.

20. The apparatus of claim 19, wherein the function includes an operation on or with the image, and wherein the image is modified.

* * * * *